Jan. 17, 1961     C. R. SCHAFER     2,968,180
ALTERNATING CURRENT BRIDGES
Filed May 4, 1956     2 Sheets-Sheet 1
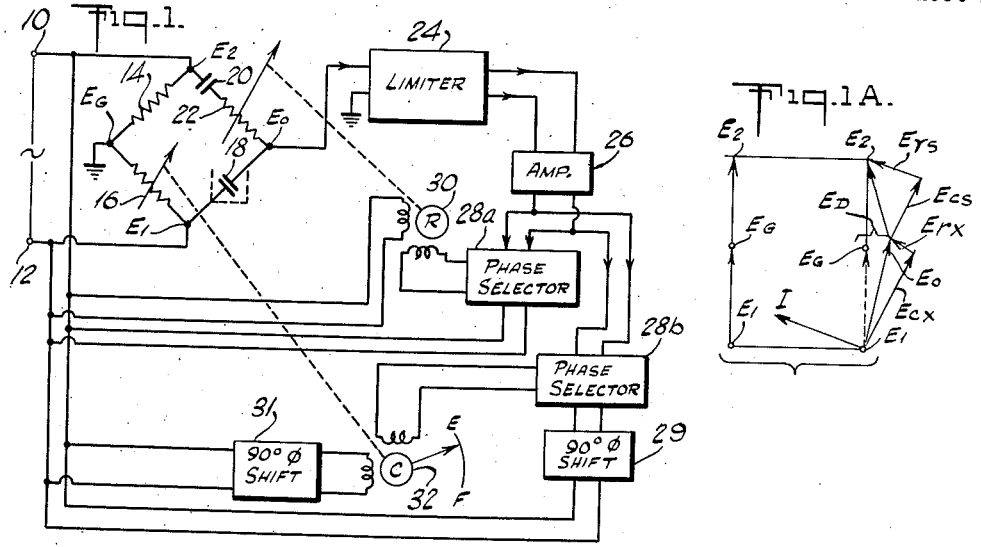
INVENTOR
CURTISS R. SCHAFER
BY Paul S Martin
ATTORNEY INVENTOR
CURTISS R. SCHAFER
BY Paul S. Martin
ATTORNEY United States Patent Office 2,968,180
Patented Jan. 17, 1961

2,968,180

ALTERNATING CURRENT BRIDGES

Curtiss R. Schafer, Clarks Summit, Pa.
(R.F.D. 1, Newtown, Conn.)

Filed May 4, 1956, Ser. No. 582,866

26 Claims. (Cl. 73—304)

The present invention relates to alternating-current bridges, and more particularly to the application of such bridges in the measurement of the dissipation factor of a liquid or the liquid level, or both, in a gaging capacitor; and, as will be seen, some aspects of the invention have broad application to the measurement of the dissipation factor of liquids and of capacitors generally.

The use of an alternating-current bridge for measuring the level of liquid in a container, using a gaging capacitor as an arm of the bridge, has been known and widely used for over ten years. A gaging capacitor includes a pair of electrodes disposed vertically in the liquid whose level is to be measured, with the capacitance varying in dependence on the extent to which the space between the electrodes is filled with the liquid. The space between the electrodes above the liquid level is ordinarily occupied by air.

In quite a different practice, alternating-current bridges are used in measuring the dissipation factor of liquids. Dissipation factor of a liquid may be expressed in percent as the ratio of the effective series resistance to the reactance of a measuring capacitor filled with the liquid, taking various constants into account.

The foregoing measurements have heretofore been made separately, to meet separate requirements. Thus, in aircraft fuel gages, the level of fuel has been measured, and no effort has been directed to measuring dissipation factor of the fuel. In the evaluation of the dissipation factor of a liquid in the laboratory, the concept of liquid level has generally been disregarded.

In accordance with the present invention, a novel combined unit is provided in which the liquid level is measured and at the same time the dissipation factor of the liquid is evaluated. These dual measurements are of particular use in connection with storage tanks of dielectric liquids. The changing dissipation factor of a liquid can be used to detect deterioration or contamination of stored liquids; and the need for knowing the level of liquid in a storage container is obvious.

Accordingly, an important factor of the present invention resides in the provision of a dual system for concurrently measuring the dissipation factor of a dielectric liquid and for measuring the level of the liquid in a container. A specific feature of this aspect of the invention resides in the provision of such a dual system utilizing a single pair of electrodes for measurement of both liquid level and dissipation factor.

Where it is desired to utilize the dissipation factor as an indication of the state of a known liquid in a container so as to detect contamination or other deterioration as evidenced by changed dissipation factor, the temperature may play an important part. Indeed the dissipation factor of some liquids is known to change widely in percentage with wide changes in temperature. A further feature of the invention, accordingly, is the provision of a dissipation factor indicating system which is largely temperature compensated so as to give a temperature-corrected indication of dissipation factor. A related feature resides in the provision of temperature compensation in gaging the liquid level, to correct the level indication in a manner to take into account the variation of dielectric constant of the liquid with variations of temperature.

In the illustrative examples that follow, dual self-balancing alternating-current bridges are employed in achieving the foregoing objects, in which reactive and resistive components of bridge unbalance are utilized to establish and maintain balance of the bridge automatically. Various forms of automatically rebalanced bridges are covered in my Patent No. 2,639,411, issued May 19, 1953. Such automatically balanced bridge is improved according to a further feature of this invention, in a manner especially useful in liquid measurement capacitors, where the reactive component of the unbalance may be very large compared with the resistive unbalance. A feature of the present invention is the improvement of the sensitivity of the system. In the illustrative embodiments of the invention detailed below, this is accomplished in several ways. In one manner this is achieved through incorporation of a limiting circuit in the channel between the bridge and the phase-responsive bridge-balancing servo motors, which is valuable in avoiding overload of the amplifiers in the channels between the output or unbalance detection terminals of the bridge and the separate phase-sensitive motors. A further and perhaps more important feature of this invention is the improved sensitivity of the null detection and the rebalancing of the bridge by separation of the components of bridge unbalance and separately applying such components to the two-phase phase-sensitive motors which restore bridge balance detection terminals of the bridge and the separate phase-sensitive motors which restore bridge balance detection terminals of the bridge and the separate respond to in-phase energization at the two energizing portions thereof, it has been found that greatly improved sensitivity and more exact measurements can be made when the components of bridge unbalance are separated before application of such unbalance signal to the two phase motors.

The nature of the present invention, and further features of novelty will be better appreciated from the following detailed description of several embodiments thereof, which are shown in the accompanying drawings that form part of this disclosure. In the drawings:

Fig. 1 is the wiring diagram of a liquid-measuring bridge embodying certain features of the present invention;

Fig. 1A is a voltage vector diagram illustrating the operating of a portion of the embodiment in Fig. 1;

Figs. 2 and 3 are wiring diagrams of modifications of the system in Fig. 1; and

Figure 4:
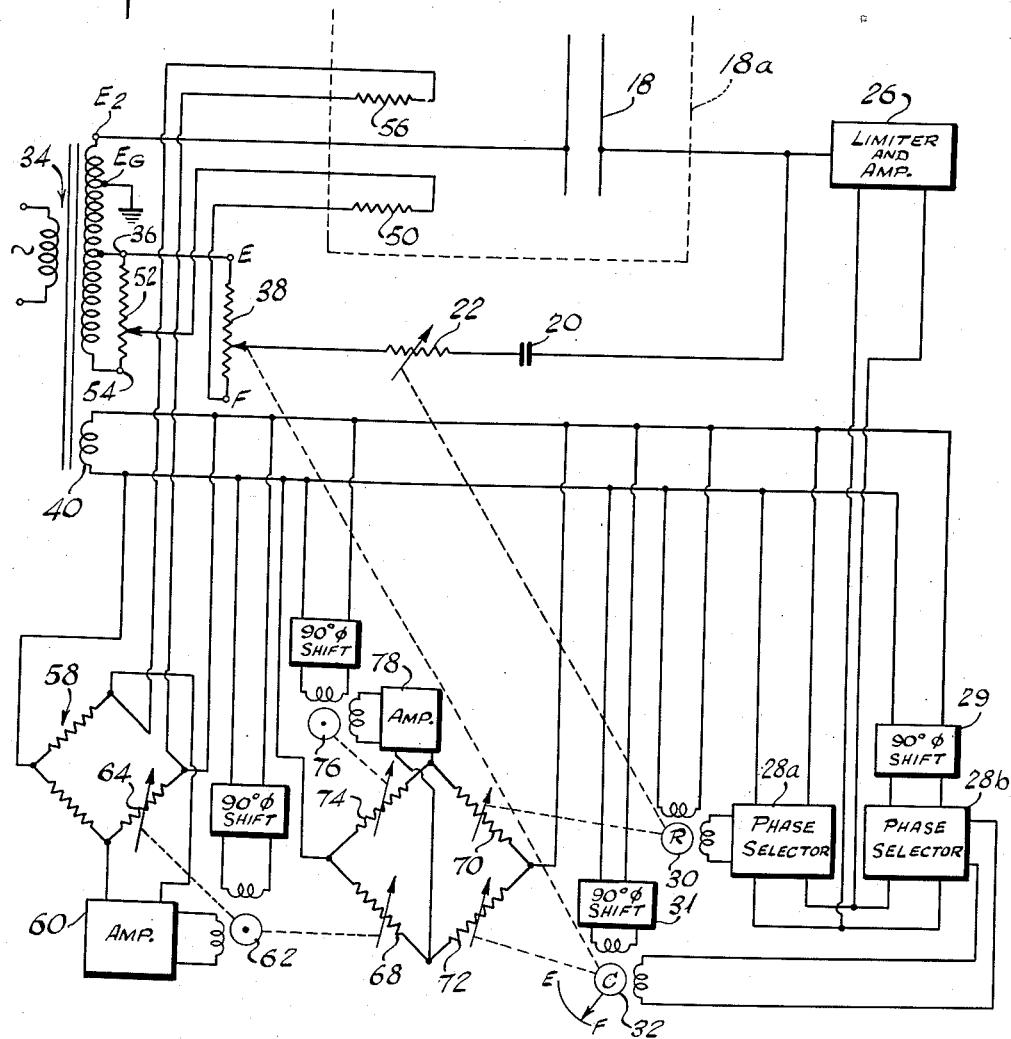
Fig. 4 is the wiring diagram of a further modification involving certain additional features of novelty.

Referring now to the drawings and in particular to Fig. 1 there is shown an alternating current bridge having excitation terminals 10 and 12, and a pair of series-connected resistors 14 and 16 (the latter being adjustable) connected between terminals 10 and 12. The junction of resistors 14 and 16 is shown grounded.

Adjoining adjustable-arm 16 of the bridge is the gaging capacitor 18 which is represented as a conventional capacitor with dotted lines representing a liquid container, the details of this capacitor 18 being omitted as being well known in the art. Such capacitors involve a pair of electrodes or plates (commonly concentric tubes) which are insulated apart and which are generally disposed vertically in a way to be variably filled with liquid as the level of liquid in the container rises or falls. As is well understood, the capacitance of such a capacitor is a function of the dielectric constant of the liquid as well as the portion of the electrodes which are immersed. The remainder of the electrodes project above the liquid level and are therefore filled with air having a dielectric constant of essentially unity. The dielectric constant of most liquids, of course, is greater than unity and on this basis, the indicator of the capacitance of the gaging capacitor can be calibrated to indicate the liquid level.

Between the bridge arms containing resistor 14 and gaging capacitor 18 are a pair of series-connected elements 20 and 22. Element 20 is a high-Q capacitor, either air-filled or with a high-Q dielectric; and element 22 is an adjustable resistor. The elements are shown series connected, which is the more practical circuit arrangement; but as is well known the alternative arrangement of a capacitor and a resistor in parallel can also be employed for like functions to be described.

When the bridge is in balance, the ratio of the resistor 14 to the resistor 16 is the same as the impedance of arm 20, 22 of the bridge to arm 18 of the bridge. This means that the ratio of the capacitive reactance of capacitor 20 to that of capacitor 18 is the same as the ratio of resistor 14 to resistor 16. Furthermore the value of resistor 22 has the same ratio to the leakage resistance of capacitor 18 which contains the liquid under investigation.

The alternating current input terminals 10 and 12 have voltages $E_1$ and $E_2$ relative to the ground potential EG of the junction of resistors 14 and 16. The junction of arm 20, 22 with arm 18 has a voltage $E_0$. This junction and the grounded junction are the unbalance detection terminals of the bridge.

Resistor 22 and resistor 16 are both adjustable, and when properly adjusted, the bridge is balanced; as will appear servo motors are used to make these adjustments automatically. When the bridge is not balanced a voltage is developed between the terminal $E_0$ and ground. This may be a very high voltage when the unbalance is great. Conventional amplifiers interposed between the unbalance detection terminals and the servo motors are likely to be insensitive or they may yield spurious output under conditions of severe overload. For this reason the output of the bridge at Fig. 1 is shown as feeding a limiter 24. This may take the form of a back-to-back parallel pair of point-contact diodes. If desired, these diodes may have self-bias or fixed bias to determine higher limits of operation than in the unbiased case (see Fig. 3). The limiter will have little effect on small signals but will prevent wide signal excursions from occurring. In this way, a system of high sensitivity can be employed to detect bridge unbalance without resulting in faulty operation under conditions of great unbalance.

The limited output is impressed on amplifier 26 and this in turn is divided in phase-selector 28a, 28b so that only selected components of the bridge unbalance are applied to two-phase servo motors 30 and 32. Amplifiers (not shown) may be interposed between phase-selectors 28a and 28b and motors 30 and 32, respectively, depending on the form of phase selectors used and on the degree of amplification produced at the input to the selectors. Reference voltage for the phase selectors and the two-phase motors is taken from terminals 10, 12. This voltage is in phase with the voltage across resistor 16. Ninety-degree phase shifters 29 and 31 are interposed between this reference voltage source and both the operating winding of motor 32 and the selector 28b that energizes the control winding of motor 32. As will be understood from the description of operation of the bridge, phase shifter 29 may be interposed between amplifier 26 and phase selector 28b rather than in the position shown. However, as a practical consideration, the arrangement shown is preferred because of constant voltage input to the phase shifter.

The operation of this circuit will be readily appreciated from an examination of Fig. 1A. The voltage developed across terminals 10 and 12 is equal to the voltage difference $E_1$ to $E_G$, plus the voltage difference $E_G$ to $E_2$. These voltages are exactly in phase, and appear at the left in Fig. 1A. The same total voltage across the resistors in series is also developed across capacitor 18 in series with resistor 22 and capacitor 20. The voltage diagram of this branch of the bridge circuit appears at the right in Fig. 1A, assuming that there is infinite impedance between the unbalance detection terminals $E_0$ and $E_G$. It is seen that $E_0$ is made up of two quadrature components $E_{cx}$ and $E_{rx}$ representing the capacitive and the effective resistive volt-drops in the liquid-measuring capacitor. Additionally, the voltage $E_0$ to $E_2$ is also made up of a pair of voltage $E_{cs}$ and $E_{rs}$. The voltage $E_0$ plus $E_2$ add up to the voltage $E_1$ to $E_2$. The voltage $E_1$, $E_G$ is shown in dotted lines at the right-hand portion of Fig. 1A. The voltage difference between $E_G$ and $E_0$ is represented by $E_D$. If the quadrature components of this unbalance voltage are separated and separately applied to the servo channels for adjusting resistor 22 and resistor 16, bridge balance can quickly and automatically be established.

Adjustment of resistor 22 establishes for that branch of the circuit the same power factor or phase-angle of the impedance that exists in the bridge arm 18. Adjustment of resistor 16 establishes the ratio of the impedance arms 14 and 16 and, by like token, ratio of the impedance arms 18 and 20, 22 when the bridge is balanced. The ratio adjusting arm, resistor 16, also establishes capacitance balance of the bridge and for this reason the motor 32 which adjusts the ratio-adjusting element of the bridge is designated by the letter C, and the motor for adjusting resistor 22 is labelled R.

Motor 30 which adjusts resistor 22, has one winding connected for in-phase energization by terminals 10 and 12. Consequently the motor responds only to the quadrature or right-angle-phased component of the bridge unbalance. This phase is separated from the total amplified unbalance voltage of the bridge in unit 28a, which may take a variety of forms. Phase bridges are one example, and phase selective amplifiers are another. In like sense, motor 32 has one of its windings energized by alternating curent from terminals 10 and 12 through a phase shifting network 29 designed to energize that winding at 90° away from the supply voltage. Consequently this motor will respond only to in-phase unbalance voltage; and this component is spearated out in the phase selector 28b. The fact that the phases are separated from each other before the voltage is applied to the respective motors means that the voltage applied to those motors is minimized. In this condition, the response of the motors is far more phase-sensitive than would be the case were the total bridge output, suitably amplified, applied to the two-phase motor. This high sensitivity particularly promotes accurate measurement of the dissipation factor where capacitive unbalance may be great and resistive unbalance may be so small, relatively. Accurate adjustment of bridge balance for accurate liquid level measurements is also achieved.

Essentially the same kind of operation is realized with other bridge arrangements, as indicated by the modified circuit of Fig. 2. In this figure, the gaging capacitor 18 is in series with a fixed resistor 14 and across the A.C. energizing terminals 10 and 12; and resistor 16' is in series with the complex-impedance bridge arm including capacitor 20' and resistor 22. Cacapictor 20' is shown as adjustable, for achieving both ratio balance and capacitive balance of the bridge. In broad principle this bridge performs the same as that of Fig. 1. Amplifier 33 provides a reference voltage source in phase with the voltage across resistor 16' as one arm of the bridge. The detailed operation need not be dwelt upon as it is unnecessary to full understanding of the invention. Other bridge arrangements will also be obvious; and the term "bridge" is intended to include equivalent networks where, for a particular energizing frequency, balance or unbalance exists and can be corrected by adjustment of resistive and reactive elements.

A still further example of alternating current bridge is illustrated in Fig. 3. Components of Fig. 1 that appear in Fig. 3 bear the same designations. In Fig. 3 the alternating-current input terminals 10 and 12 correspond to those in Fig. 1, shown as being at the ends of a transformer secondary winding. This transformer secondary has a tap which is connected to ground, designated $E_G$, and between another tap 36 of this secondary winding and the above mentioned terminal 12 is a potentiometer 38. Terminal 36 is chosen in relation to capacitor 20 so that when the gaging capacitor 18 is empty, and when the potentiometer 38 has its adjustable contact at terminal 36, the bridge will be balanced. Resistor 22 and capacitor 20 appear in Fig. 3 exactly as in Fig. 1. Potentiometer 38 may be calibrated from "Empty" to "Full," as represented by the symbols E and F in the drawing, for a liquid of predetermined dielectric constant.

The output of amplifiers 26 is impressed on a pair of phase-selective amplifiers 28a and 28b. This includes a pair of push pull triodes in which the grids and anodes are energized 180° out of phase, when no output is to be yielded. When the phase of the energization of the output of amplifier 26 differs from 180° in relation to the reference voltage impressed on phase shifter 29, output is developed and applied to motor 32. No matter how large the output of amplifier 26 no voltage reaches the motor 32 unless it has the proper component needed, the component that indicates capacitive unbalance. Phase selective amplifier 28b is arranged to respond only to that component of the bridge unbalance, as amplified, at right angles to that impressed on the reference winding of motor 32.

The two motors 30 and 32 have their reference windings energized by winding 40 of the transformer, motor 32 via a phase shifter 31.

In operation all three bridges perform with a commendable stability and high sensitivity by virtue of the inclusion of the limiters and the phase selectors. The bridge, when balanced, will be useful to provide an indication of the level of the liquid in the gaging capacitor. This may be calibrated directly on potentiometer 38 (Fig. 3) as well as resistor 16 and capacitor 20' of the other figures. Part of the gaging capacitor is occupied by air, and partly for this reason the actual capacitance of the gaging capacitor is not a true measure of the liquid level but only a measure which can be calibrated to allow for the portion of the gaging capacitor that projects above the liquid level.

The reading of the calibration of resistor 22 cannot be used as an indication of dissipation factor. The varying degrees of exposure of the gaging capacitor above the liquid would involve a varying "dissipation factor" (were this read from the resistor calibration) as the liquid level changes even though the quality of the liquid remained unchanged.

The circuit of Fig. 4 accomplishes the measurement of liquid level, and this circuit uses the same gaging capacitor to give additionally a direct reading of dissipation factor. In Fig. 4, like numerals are employed for corresponding parts in Figs. 1–3 inclusive. In Fig. 4, one arm of the potential bridge is found between terminals $E_2$ and $E_G$; and a second arm of the bridge is found between terminal $E_G$ and terminal 12', the sliding contact on potentiometer 38. Point 36 is again selected so that bridge balance exists when gaging capacitor 18 is empty and when potentiometer 38 has its sliding contact at terminal 36. At this time, resistor 22 is at a maximum, for as the capacitance of the gaging capacitor drops, its capacitive reactance and its effective series resistance rise.

In series with potentiometer 38 is a temperature sensitive resistor 50, selected to have a temperature-resistance characteristic, and a resistance value in relation to the resistance of potentiometer 38, so that the dielectric constant variations of the liquid with varying temperatures will be compensated to a close approximation by varying potential drop between terminal 36 and any given setting of the sliding contact of resistor 38. Additionally, a further potentiometer 52 is provided between terminal 36 and an extreme potential point 54 of the transformer secondary, in order that adjustment may be made for liquids of different dielectric constants. This latter adjustment is of course made with the gaging capacitor completely filled with liquid in the container 18a.

Amplifier 26 in the example of Fig. 4 embodies suitable limiting apparatus, which need not be of the diode form although that form is of particular practical advantage.

Phase selectors 28a and 28b have the signal from amplifier 26 compared with a reference signal from the supply winding 40, the reference signal for selector 28b being shifted 90° in shifter 29. The output voltages of phase selectors are impressed on a pair of servo amplifiers (not shown), the function of which was incorporated in the phase selective amplifiers 28a and 28b of Fig. 3.

An additional temperature responsive resistor or thermistor 56 is immersed in the liquid of container 18a, and this resistor is connected in a self-balancing resistance bridge generally designated 58 which has a servo-amplifier 60 and a servo-motor 62 for adjusting resistor 64. Bridge 58 remains self-balancing so that the angular position of the adjustable element of resistor 64 at all times represents the resistance of resistor 56 and, indirectly, the temperature, of the liquid. A resistor 68 in another bridge 66 is mechanically coupled to resistor 64. The dissipation factor of some liquids may vary according to some completely arbitrary function, with varying temperatures. In case of such an irregular function, the variation of resistance 68 with varying displacement of its adjustable element is made to accord with this characteristic.

In bridge 66 there are three additional resistors 70, 72 and 74. Each of these resistors is adjustable, and each of them is operated by a servo motor. Resistor 68 is mechanically driven by servo motor 62 which adjusts temperature representing resistor 64 of bridge 58. Resistor 72 is mechanically coupled to servo motor 32 which adjusted the ratio of the main bridge including gaging capacitor 18. The displacement-resistance characteristic of resistor 72 is such as to represent the capacitive reactance of the liquid-filled portion of the main bridge. Similarly, resistor 70, proportional to the value of resistor 72 at all adjustments, is coupled to resistor 22 for conjoint operation by motor 30. Finally, resistor 74 is adjustable, under control of servo motor 76, which is operated in response to the unbalance output of bridge 66, the unbalance being suitably amplified by servo amplifier 78.

At the outset it may be assumed that resistor 68 is fixed at some value corresponding to a given temperature of thermistor or temperature-responsive resistor 56, as converted by bridge 58 to some setting of resistor 68.

When the main bridge is balanced, motors 30 and 32 come to rest and resistors 70 and 72 are then fixed in value. Assuming that these have appropriate characteristics of angular position versus resistance (in the case of a rotary or a helical resistor) resistor 74 will quickly reach a steady position of adjustment. The ratio of resistor 74 to resistor 68 is then equal to the ratio of resistor 70 to 72. The latter will be recognized as the dissipation factor. Since it has been assumed that resistor 68 is fixed, it is apparent therefore that the scale of resistor 74 may be calibrated directly in terms of dissipation factor. When resistor 68 is changed in its adjustment, because of a change in temperature of the liquid in which resistor or thermistor 56 is immersed, the reading of the scale of resistor 74 will change. However the new reading will be a temperature-compensated indication of the dissipation factor. Thus, if temperature compensation were not desired and if the actual dissipation factor of the liquid were desired, resistor 68 would remain fixed and could be replaced by a fixed resistor. Furthermore, if the temperature-dissipation factor characteristic of the liquid were similar to the temperature-resistance characteristic of an available temperature-variable resistor, then resistor 56 could be directly connected in bridge 66 in place of resistor 68. The use of a separate servo bridge 58 makes convenient the arbitrary choice of resistance-displacement characteristics of the resistors 64 and 68. As is well understood in the art, entirely arbitrary curves of resistance v. displacement can be readily made by making cards of resistance material with predetermined lateral edge contours about which to wind resistance wire, so that later, when a slide is moved along the card and across the turns of resistance wire, the resistance-displacement characteristic is what was intended. Other forms of resistors with arbitrary characteristics may readily be used.

The measurement bridge of Fig. 4, that portion of the network which incorporates capacitor 18, is similar to the bridges of Figs. 1 through 3 inclusive. It is intended that the additional servo circuits and control circuits of Fig. 4 are to be used with the measurement bridges of Figs. 1 to 3, as well as others known to those skilled in the art. See also my U.S. Patent No. 2,639,411, issued May 19, 1953. It should also be understood, that while the servo bridge 66 is highly advantageous in that it enables a remote and extremely accurate indication to be derived, nevertheless other devices for obtaining the ratio of the effective series resistance to the reactance of the immersed portion of the gaging capacitor can be employed. Thus a ratio meter may be used having a pair of coils at right angles to each other with a movable indicator, to be positioned by the resultant magnetic fields of those coils; and other forms of electrical and electromechanical ratio indicators can be employed, with appropriate calibration, in obtaining the dissipation factor where the main measurement bridge provides separate representations of the leakage resistance and of the reactance of the measuring capacitor 18.

Still further variations and varied applications of the foregoing concepts will be readily understood and practised by those skilled in the art, and therefore the illustrative disclosure should not be limited but should be broadly construed in a manner consistent with the spirit and scope of the invention.

What I claim is:

1. A capacitor-type liquid measuring system, including an alternating-current potential bridge having input terminals for connection to an alternating current source and unbalance detection terminals, said bridge further having in one arm thereof a pair of electrodes adapted to be disposed vertically in a container to be variably filled by liquid in the container and thereby to function as a gaging capacitor, a variable resistor and a high-Q capacitor in an adjoining arm of the potential bridge, said bridge including adjusting means for establishing reactive balance of the bridge, a pair of phase-sensitive devices coupled to said bridge input terminals for energization by said alternating current source and arranged to adjust said variable resistor and said reactive balance adjusting means, respectively, and energizing means connected to said devices including a pair of separate phase-selective translating channels having phase reference means and connected to the unbalance detection terminals, each channel being operative to transmit a respective one of the quadrature components of any existing unbalance voltage of the bridge and to apply such components respectively to said variable resistor adjusting device and to the adjusting device for said reactive balance adjusting means.

2. A system in accordance with claim 1 wherein said phase-selective channels and said phase sensitive devices include respective in-phase reference means and quadrature reference means coupled to a source in phase with the voltage across one of the arms of the bridge.

3. A capacitor-type liquid measuring system, including an alternating current potential bridge having input terminals for connection to an alternating current source and unbalance detection terminals, said bridge further having in one arm thereof a pair of electrodes adapted to be disposed vertically in a container to be variably filled with liquid in the container, thereby to serve as a gaging capacitor, a variable resistor and a high-Q capacitor in an adjoining arm of the potential bridge, said bridge including adjustable means for establishing resistive and reactive bridge balance, a pair of phase-sensitive devices coupled to said bridge input terminals for energization by said alternating current source and arranged to adjust said variable resistor and said adjusting means, respectively, and energizing means for said devices including a pair of separate phase-selective translating channels having phase reference means and connected to said unbalance detection terminals, each channel being operative to transmit a respective one of the quadrature-related components of any existing unbalance voltage of the bridge and to apply such components respectively to said variable resistor adjusting device and to the adjusting means for said adjusting means.

4. A system in accordance with claim 3 wherein said phase-selective channels and said phase sensitive devices include respective in-phase reference means and quadrature reference means coupled to a source in phase with the voltage across one of the arms of the bridge.

5. An alternating-current potential bridge having alternating current input terminals and unbalance detection terminals, a lossy reactive impedance constituting one arm of said bridge, a variable resistor and a high-Q reactive impedance in an adjoining arm of the potential bridge, said bridge including adjusting means for establishing balance of the bridge with respect to the reactances in said arms, a pair of phase-sensitive devices respectively coupled to said adjusting means and to said variable resistor, energizing means connected to said devices including phase-selective translating channels responsive to any unbalance voltage components at said unbalance detection terminals, respective in-phase reference voltage coupling means connected to one of said phase-sensitive devices and connected to one of said phase-selective channels, and respective quadrature reference voltage coupling means connected to the other of said phase-sensitive devices and connected to the other of said phase-selective channels, said reference voltage coupling means all having a reference voltage source in phase with the voltage drop across one arm of said bridge.

6. An alternating-current potential bridge in accordance with claim 5, wherein said lossy reactive impedance is a pair of capacitor plates having a lossy liquid therebetween and wherein said variable resistance and said bridge balance establishing means are coupled to means representing the loss factor of said lossy reactive impedance.

7. A capacitor-type liquid level gaging and dissipation factor indicating system, including an alternating-current potential bridge having alternating-current input terminals and unbalance detection terminals, said bridge further having in one arm thereof a pair of capacitor plates adapted to have the space therebetween variably filled with the liquid in a container to serve as a gaging and dissipation factor measuring capacitor, a variable resistor and a high-Q capacitor in an adjoining arm of the potential bridge, said bridge including adjusting means for establishing bridge balance with respect to capacitive reactances in the arms of the bridge, a pair of phase-sensitive devices having reference voltage means connected thereto respectively in phase and in quadrature with respect to the voltage across an arm of the bridge, energizing means connected to said devices including phase-selective translating channels having input coupling to said unbalance terminals and having voltage reference means connected thereto respectively in phase with and in quadrature to the voltage across one arm of said bridge.

8. A capacitor-type dissipation factor indicating system for variable-level liquids, including an alternating-current potential bridge having alternating-current input terminals and unbalance detection terminals, said bridge further having in one arm thereof a pair of capacitor plates adapted to have the space therebetween variably filled with the liquid in a container to serve as a gaging and dissipation factor measuring capacitor, a variable resistor and a high-Q capacitor in an adjoining arm of the potential bridge, said bridge including adjusting means for establishing bridge balance with respect to capacitive reactances in the arms of the bridge, a pair of phase-sensitive devices having reference voltage means respectively in phase and in quadrature with respect to the voltage across an arm of the bridge, energizing means connected to said devices including phase-selective translating channels having input coupling to said unbalance terminals and having voltage reference means respectively in phase with and in quadrature to the voltage across one arm of said bridge, said bridge balancing means being thereby variable in accordance with the liquid-level, and a dissipation factor indicator including means coupled to and operated conjointly with said adjustable resistor, means coupled to and operated conjointly with said bridge balancing means as a representation of the liquid level, and means operable in dependence on both said conjointly operated means for resolving the dissipation factor.

9. A capacitor-type liquid level gaging and dissipation factor indicating system, including an alternating-current potential bridge having alternating current input terminals and unbalance detection terminals, said bridge further having in one arm thereof a pair of spaced plates adapted to be disposed vertically in a liquid container and to be variably filled with liquid in the container to serve as a gaging and dissipation factor measuring capacitor, a variable resistor and a high-Q capacitor in an adjoining arm of the potential bridge, adjustable means forming part of said bridge for establishing balance of the bridge with respect to capacitive reactances in said arms, means for automatically establishing balance including separate devices coupled to said adjustable resistor and to said capacitive reactance balancing means, said adjustable means including a liquid-level indicator, and a dissipation factor indicator including means coupled to and operated conjointly with said adjustable resistor, means coupled to and operated conjointly with said adjustable means and variable as a representation of the liquid-filled part of said plates, and means operable in dependence on both said conjointly operated means for resolving the dissipation factor.

10. A capacitor-type combined liquid level and dissipation factor system, including an alternating-current potential bridge having separate devices for establishing reactive balance and resistive balance of the bridge and including in one arm of the bridge a pair of capacitor plates adapted to be disposed vertically in a liquid container to be variably filled with liquid, an indicator coupled to said reactive balance establishing devices and calibrated to indicate the level of the gaging capacitor plates occupied by liquid, and means jointly controlled by the reactive and the resistive balance establishing devices and including an element variable specifically as a direct function of the liquid-filled portion of said capacitor plates for representing the dissipation factor of the liquid.

11. A capacitor-type combined liquid level and dissipation factor system, including an alternating-current potential bridge having separate devices for establishing reactive balance and resistive balance of the bridge and including in one arm of the bridge a pair of capacitor plates adapted to be disposed vertically in a liquid container to be variably filled with liquid, an indicator coupled to said reactive balance establishing devices and calibrated to indicate the level of the gaging capacitor plates occupied by liquid, and means jointly controlled by the reactive and the resistive balance establishing devices for representing the dissipating factor of the liquid, said jointly controlled means including a self-balancing bridge having a pair of adjustable arms operated respectively with said resistive and reactive balance establishing devices and including an element variable specifically as a direct function of the liquid-filled portion of said capacitor plates.

12. A capacitor-type combined liquid level and dissipation factor indicating system, including an alternating-current potential bridge having separate devices for establishing reactive balance and resistive balance of the bridge and including in one arm of the bridge a pair of capacitor plates adapted to be disposed vertically in a liquid container to be variably filled with liquid, an indicator coupled to said reactive balance establishing devices and calibrated to indicate the level of the gaging capacitor plates occupied by liquid, and means jointly controlled by the reactive and the resistive balance establishing devices and including an element variable specifically as a direct function of the liquid-filled portion of said capacitor plates for representing the dissipation factor of the liquid, and further means modifying the thus obtained dissipation factor representation in relation to the temperature of the liquid and including a temperature responsive resistor in the container, said further means also including adjustable means controlled by said temperature-responsive resistor and variable according to the temperature variation of dissipation factor of the liquid.

13. A capacitor-type combined liquid level and dissipation factor indicating system, including an alternating-current potential bridge having separate devices for establishing reactive balance and resistive balance of the bridge and including in one arm of the bridge a pair of capacitor plates adapted to be disposed vertically in a liquid container to be variably filled with liquid, an indicator coupled to said reactive balance establishing means and calibrated to indicate the level of the gaging capacitor plates occupied by liquid, and a self-balancing bridge including adjustable impedance elements controlled, respectively, by said reactive and resistive balance establishing devices, for representing the dissipation factor of the liquid in the plates of the capacitor, the adjustable arm of said self-balancing bridge that effects reactive balance being variable as a specific function of the liquid-filled portion of said capacitor plates.

14. A capacitor-type combined liquid level and dissipation factor indicating system, including an alternating-current potential bridge having separate devices for establishing reactive balance and resistive balance of the bridge and including in one arm of the bridge a pair of capacitor plates adapted to be disposed vertically in a liquid container to be variably filled with liquid, an indicator coupled to said reactive balance establishing devices and calibrated to indicate the level of the gaging capacitor plates occupied by liquid, and a self-balancing bridge including adjustable arms controlled, respectively, by the reactive and said resistive balance establishing devices, for representing the dissipation factor of the liquid in the electrodes of the capacitor, said self-balancing bridge including a further adjustable arm, a temperature-responsive element adapted to be immersed in the liquid, and means variable in accordance with the temperature variation of the dissipation factor under control of said element and coupled to said further adjustable arm and effective to modify the representation of dissipation factor in dependence upon the temperature of the liquid.

15. A capacitor-type liquid measuring system, including an alternating-current potential bridge having alternating current input terminals and unbalance detection terminals and further having in one arm thereof a pair of electrodes adapted to be variably filled with the liquid of a container in which the electrodes are vertically disposed to serve as a gaging capacitor, a variable resistor and a high-Q capacitor in an adjoining arm of the potential bridge, said bridge including adjusting means for establishing bridge balance with respect to capacitive reactance in said arms, a pair of phase-sensitive devices having reference voltage connection to said bridge and being arranged to be separately responsive to in-phase and quadrature components of bridge unbalance for adjusting said resistor and said adjusting means, respectively, amplitude limiting and amplifying means connected to the unbalance detection terminals of the bridge, and a pair of phase-selective translating channels connected to said last-mentioned means, having reference voltage connection to said bridge and separately responsive to in-phase and quadrature unbalance components, said translating channels being operative to transmit respective components of any existing bridge unbalance to said phase-sensitive devices.

16. A capacitor-type combined liquid level gaging and dissipation factor indicating system, including an alternating-current potential bridge having in one arm thereof a pair of electrodes adapted to be disposed vertically in a liquid container so as to have the space therebetween variably filled by the level of liquid in the container, a variable resistor and a high-Q capacitor in an adjoining arm of the potential bridge, said bridge including adjusting means for establishing bridge balance with respect to reactances in said arm, a pair of phase-sensitive devices separately responsive to in-phase and quadrature components of bridge unbalance and adapted to adjust said adjusting means and said variable resistor, respectively, energizing means for said devices including phase-selective channels each operative to transmit a respective one of the in-phase and the quadrature components of any existing bridge unbalance to said phase-sensitive devices to establish bridge balance automatically, means controlled respectively by said variable resistor adjusting device and by said reactance-balance adjusting device in direct relation to the liquid-filled portion of said electrodes for indicating the dissipation factor of the liquid, and means variable in accordance with the temperature variation of dissipation factor and including a temperature-variable element adapted to be immersed in the liquid of the container for modifying the indication of dissipation factor.

17. A capacitor-type combined liquid level gaging and dissipation factor indicating system, including an alternating-current potential bridge having in one arm thereof a pair of electrodes adapted to be disposed vertically in a liquid container so as to have the space therebetween variably filled by the level of liquid in the container, a variable resistor and a high-Q capacitor in an adjoining arm of the potential bridge, said bridge including adjusting means for establishing bridge balance with respect to reactances in said arms, a pair of phase-sensitive devices having alternating-current reference connection to said bridge separately responsive to in-phase and quadrature components of bridge unbalance and adapted to adjust said adjusting means and said variable resistor, respective, energizing means for said devices including phase-selective channels having alternating-current reference connection to said bridge each operative to transmit a respective one of the in-phase and the quadrature components of any existing bridge unbalance to said phase-sensitive devices to establish bridge balance automatically, means controlled respectively by said variable resistor adjusting device and said reactance-balance adjusting device for indicating the dissipation factor of the liquid-filled portion of the pair of electrodes, and means including a temperature-variable element adapted to be immersed in the liquid of the container for modifying the indication of dissipation factor, said last-named means including a self-balancing bridge including said temperature-variable element and including a mechanical coupling between said self-balancing bridge and said dissipation factor indicating means.

18. Dissipation factor measurement apparatus, including an alternating current potential bridge having separate devices for establishing reactive balance and resistive balance of the bridge and including in one arm of the bridge a pair of capacitor plates adapted to be disposed vertically in a liquid container to be variably filled with liquid, and a self-balancing bridge including adjustable arms controlled, respectively, by said devices for representing dissipation factor of the liquid between the plates of the capacitor, one of said arms being variable with the liquid-filled portion of said capacitor plates.

19. Apparatus in accordance with claim 10 including an unbalance detector, respective servomotors for adjusting said separate devices, and respective phase-selective channels between said unbalance detector and said servomotors, said servomotors and said channels having alternating current reference connection to said alternating current bridge.

20. An alternating-current potential bridge having alternating current input terminals and unbalance detection terminals, a lossy reactive impedance constituting one arm of said bridge, a resistor and a high-Q reactive impedance in a balancing arm of the potential bridge, said bridge including adjusting means for establishing balance of the bridge with respect to the reactances in said arms and adjusting means for establishing balance of the bridge with respect to the resistances in said arms, a pair of phase-sensitive devices respectively coupled to both said adjusting means, energizing means connected to said devices including phase-selective translating channels responsive to any unbalance voltage components at said unbalance detection terminals, in-phase reference voltage coupling means connected to one of said phase-sensitive devices and connected to one of said phase-selective channels, and quadrature reference voltage coupling means connected to the other of said phase-sensitive devices and connected to the other of said phase-selective channels, said reference voltage coupling means all having a reference voltage source in phase with the voltage drop across one arm of said bridge.

21. An alternating-current potential bridge in accordance with claim 20, wherein said lossy reactive impedance is a pair of capacitor plates having a lossy liquid therebetween and wherein both said bridge balance establishing means are coupled to means representing the loss factor of said lossy reactive impedance.

22. A capacitor-type combined liquid level and dissipation factor indicating system, including an alternating-current potential bridge having separate devices for establishing reactive balance and resistive balance of the bridge and including in one arm of the bridge a pair of capacitor plates adapted to be disposed vertically in a liquid container to be variably filled with liquid, an indicator coupled to said reactive balance establishing devices and calibrated to indicate the level of the gaging capacitor plates occupied by liquid, and means effective upon balance of the bridge in dependence upon both the level of liquid as represented by the liquid-filled portion of the capacitor plates and upon the resistance loss of the liquid for representing the dissipation factor of the liquid, and further means modifying the thus obtained dissipation factor representation in relation to the temperature of the liquid and including a temperature responsive resistor in the container.

23. A liquid-indicating alternating-current bridge, including in one branch thereof a pair of capacitor plates adapted to contain the liquid, said bridge having a balancing branch, a potentiometer for adjusting the voltage applied to one of said branches for establishing balance of the bridge and a temperature-variable impedance element immersed in the liquid and arranged to control the voltage available to said potentiometer as a function of the temperature of the liquid.

24. A dissipation-factor indicating self-balancing alternating-current bridge including in one branch thereof a pair of capacitor plates adapted to contain a liquid to a variable level, said bridge having a balancing branch, a potentiometer for adjusting the voltage applied to one of said branches, a temperature-variable element immersed in said liquid controlling the voltage available to said potentiometer, ratio means operated by said self-balancing bridge for indicating the dissipation factor of the liquid, and a second temperature-variable element immersed in the liquid to modify the indication of said ratio means.

25. A capacitor-type indicating system in accordance with claim 8, in which said bridge-balancing means is provided with a liquid-level indicator.

26. A capacitor-type dissipation factor indicator for variable-level liquids, including an alternating current bridge having separate devices for establishing reactive balance and resistance balance thereof, and including in one arm of the bridge a pair of electrodes to be disposed vertically in a container for the liquid, said devices providing, respectively, representations of the capacitance and of the dissipation loss of the liquid between the electrodes, means coupled to said reactive balance establishing means for representing the fraction of said electrodes immersed in the liquid, adjustable means connected to said bridge for establishing the range of said coupled means between "empty" and "full" limits in accordance with the dielectric constant of the liquid, means coupled to said loss representation means for variation therewith, and dissipation factor representing means conjointly controlled by both said coupled means.

References Cited in the file of this patent
UNITED STATES PATENTS

| | | |
|---|---|---|
| 2,349,860 | Hainer | May 30, 1944 |
| 2,535,027 | Anderson | Dec. 26, 1950 |
| 2,582,400 | Smith | Jan 15, 1952 |
| 2,623,206 | Hornfeck | Dec. 23, 1952 |
| 2,639,411 | Schafer | May 19, 1953 |
| 2,848,669 | Smith | Aug. 19, 1958 |
| 2,867,120 | Shafer | Jan. 6, 1959 |

OTHER REFERENCES

Cosens: Phys. Soc. XIVI, 6; "A Balance Detector for Alternating Current Bridges," May 26, 1934.

Lamson: AIEE Technical Paper, "Electronic Null Detectors for Use With Impedance Bridges," December 1946.

Graham: "Automatic A.C. Bridges," Electronics, February 1951; pp. 110–116.